Dec. 29, 1931.  W. E. HUENEFELD  1,838,552
PAN PULLER FOR STOVE OVENS
Filed Oct. 21, 1929
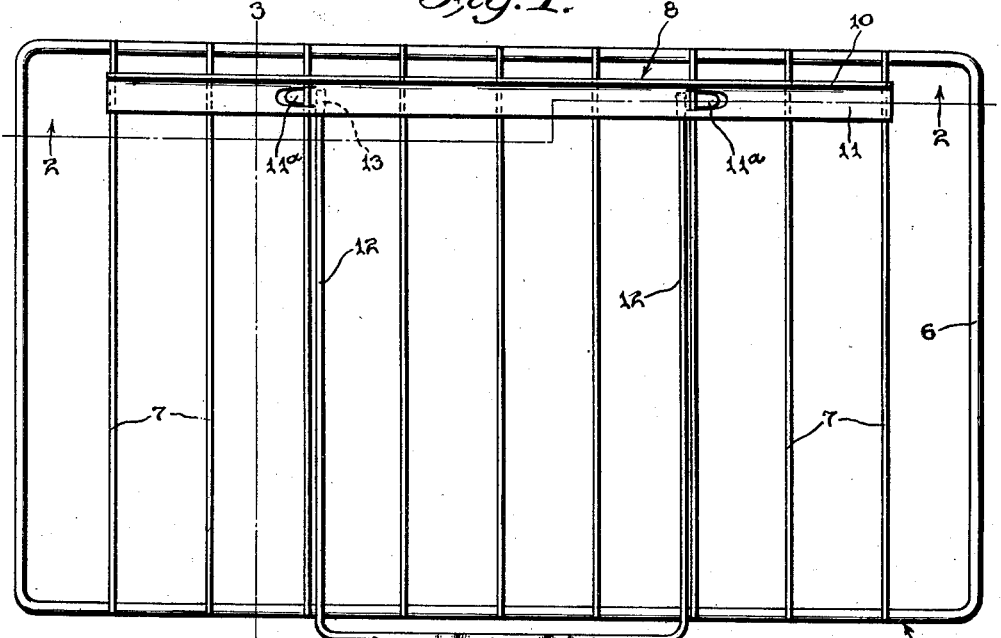
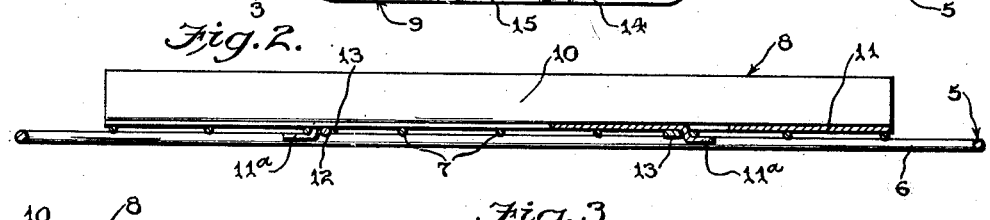
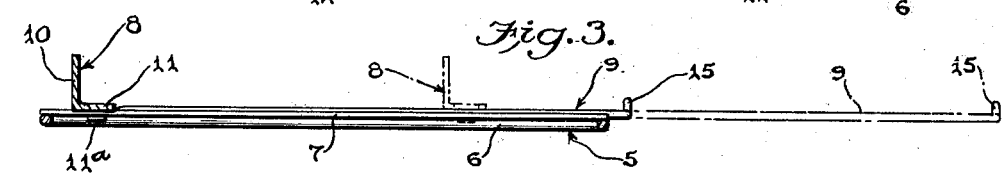
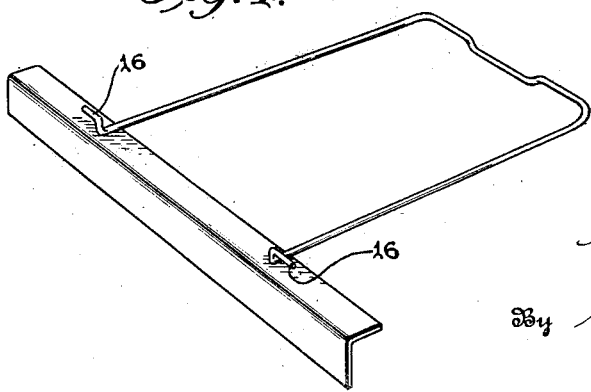
Inventor
W. E. Huenefeld
By Seymour & Bright
Attorneys Patented Dec. 29, 1931

1,838,552

UNITED STATES PATENT OFFICE

WALTER E. HUENEFELD, OF CINCINNATI, OHIO

PAN PULLER FOR STOVE OVENS

Application filed October 21, 1929. Serial No. 401,233.

This invention relates to improvements in pan pullers for stove ovens.

It has heretofore been proposed to provide ovens or oven racks with pan pullers, but in each instance, so far as I am aware, it was found necessary, either to alter the stove or rack wherever the pan puller was attached or connected to the stove or oven rack.

The primary object of the present invention is to provide a pan puller which may be connected to or attached to an oven rack without altering the latter, and which will remain attached to the rack until it is detached from the same by an operator.

Another object of the invention is to provide a pan puller of simple, and inexpensive construction, and one which can preferably be made from two elements.

A further object is to provide a pan puller consisting of a pull bar that is adapted to be normally arranged at the rear edge of an oven rack, and connected to the rear ends of a handle member; the construction being such that hooks or the like, positioned at the rear ends of the handle member, will function to slidably interlock with bars of the oven rack.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a plan view of the preferred form of my pan puller, shown attached to an oven rack.

Fig. 2 is a vertical sectional view of the same, on the line 2—2 of Fig. 1.

Fig. 3 is a similar view on the line 3—3 of Fig. 1.

Fig. 4 is a perspective view of a modified form of pan puller shown in inverted position.

In the drawings, 5 indicates an oven rack which is of the usual type, comprising a rectangular frame 6, to which are rigidly connected the ends of cross bars 7. Such rack is of conventional construction. My improved pan puller is preferably manufactured so as to include only two members; a pull bar 8 and a handle member 9. The pull bar consists of a length of angle iron having an upstanding wing 10 and a horizontal wing 11, the latter being punched at two points to provide tongues which are pressed downwardly and shaped to provide guide hooks or fingers 11$^a$. It will be observed that these hooks extend in opposite directions, so as to slidably engage a pair of the bars of the oven rack, and it will be evident that when the pull bar is properly positioned and arranged diagonally to the cross bars 7 of the rack, that the hooks 11$^a$ may be attached to, or detached from the pair of bars 7.

The handle member 9 is preferably of U-shape, and may be made from a piece of wire, the rear ends of the arms 12 of which are connected to the pull bar by any suitable means such as welding, as shown at 13. The cross member 14 of the handle is arranged substantially parallel to the pull bar, and its central portion is bent into substantially inverted U-shape, as shown at 15, to provide a projection which may be readily grasped by the operator when it is desired to slide the pan puller over the oven rack.

Instead of stamping the pull bar to provide the guide hooks or fingers, the rear ends of the arms of the handle member may be bent into hook form as shown at 16 in Fig. 4, and these oppositely extending hooks may be interconnected with a pair of the bars of the oven rack, the same as the guide hooks in the embodiment shown in Figs. 1 to 3 inclusive.

It will be observed in both forms of the device, that the arms 12 of the handle member are spaced apart a considerable distance, so that they will readily support a pan when the device is pulled forwardly on the oven rack.

From the foregoing it will be appreciated that I have devised a construction in which the pan puller may be readily attached to, or detached from the oven rack by an unskilled person, without altering the rack, and further, that I have devised a pan puller which is of simple and inexpensive construction, and one that may be sold as an attachment.

While I have disclosed what I now consider to be preferred embodiments of the invention, in such manner that the same may be readily understood by those skilled in the art, I am aware that various changes may be made in the details disclosed, without departing from the spirit of the invention, as expressed in the claims.

What I claim and desire to secure by Letters Patent is:

1. A pan puller including an upstanding pull bar to rest on and project above an oven rack, a handle member connected to the pull bar, and means movable with said pan puller and shaped to be detachably inter-connected with an oven rack when the pan puller is turned in a certain way relatively to said rack.

2. A pan puller for use with oven racks, including an upstanding pull bar to rest on and project above an oven rack, a handle member secured to the pull bar, and oppositely projecting guide fingers rigidly connected to said parts and adapted to be slidably inter-connected with the bars of an oven rack.

3. A pan puller for use with oven racks, comprising an upstanding pull bar member to rest on and project above an oven rack, a U-shaped handle member having its ends connected to the pull bar member, and oppositely projecting fingers provided on one of said members adapted to be detachably inter-connected with bars of an oven rack.

4. A pan puller for use with oven racks, comprising an upstanding pull bar member to rest on and project above an oven rack, a U-shaped handle member having its ends secured to the pull bar member, one of said members being provided with rigid oppositely extending hooks designed to be inter-connected and to slidably engage bars of an oven rack.

5. A pan puller for oven racks, comprising an upstanding pull bar member to rest on and project above an oven rack, a substantially U-shaped handle member having its end portions rigidly connected to the pull bar member, one of said members being provided with integral oppositely extending hooks designed to slidably engage and to be inter-connected with the bars of an oven rack.

6. A pan puller for oven racks, comprising a pull bar member of angle shaped cross section, one wing of the angle projecting upwardly, a handle member rigidly connected to the pull bar member, and hooks on one of said members adapted to engage bars of an oven rack.

7. A pan puller for oven racks, comprising an upstanding pull bar member to rest on and project above an oven rack, a handle member rigidly connected to the pull bar member, and projecting means movable with said members and adapted to slidably engage bars of an oven rack.

8. A pan puller for oven racks or the like, including an upstanding pull bar member to rest on and project above an oven rack, a substantially U-shaped handle member rigidly connected to the pull bar member and having a cross part provided with an upwardly extending substantially inverted U-shaped portion.

9. The combination with an oven rack having spaced cross bars, of a pan puller mounted on said rack and comprising an upstanding pull bar member normally arranged at the rear edge portion of and resting on the rack, a substantially U-shaped handle member having its end portions rigidly connected to the bar member and having a cross part normally positioned adjacent the front edge of the oven rack, said cross portion having a projecting part to facilitate grasping of the handle member by the operator, and oppositely extending hooks rigidly united with said members and slidably engaging a plurality of the bars of the rack.

In testimony whereof, I have signed this specification.

WALTER E. HUENEFELD.